United States Patent Office 2,750,339
Patented June 12, 1956

2,750,339
METHOD FOR INHIBITING CORROSION

Frederick P. Steinhauff, Houston, Tex., assignor, by mesne assignments, to Esso Research and Engineering Company, Elizabeth, N. J., a corporation of Delaware No Drawing. Application April 3, 1953, Serial No. 346,779

14 Claims. (Cl. 252—8.55)

The present invention is directed to a method for preventing corrosion. More particularly, the invention is directed to the inhibition of the corrosiveness of moisture-containing fluids to ferrous metals. In its more specific aspects, the invention has to do with the inhibition of corrosive well fluids such as fluids from oil and gas wells and the like in contact with ferrous metal such as well head equipment and ferrous tubing strings and the like.

The present invention may be briefly described as involving a method in which an inhibiting amount of the reaction product, obtained by heating together at a reaction temperature reactive amounts of an alkylene primary polyamine and the residue containing long-chained polycarboxylic acids having an acid number in the range between about 140 and about 180, having an iodine number between about 30 and about 80, and being the nonvolatile material remaining from distilling at a reduced pressure, the by-product acids obtained in the preparation of sebacic acid from castor oil by treatment with alkali, is introduced into a corrosive fluid such as one including hydrocarbon, moisture and acid in contact with a corrodible ferrous metal in an amount sufficient to inhibit the corrosivity of the corrosive fluid.

The corrosive fluid may contain acidic gases such as carbon dioxide and hydrogen sulfide and may also contain organic acids such as acetic acid, and the like. The invention is not limited to corrosive fluids containing hydrocarbon, water and acidic gases and the like, such as illustrated. It is applicable to corrosive fluids such as dilute solutions of the mineral acids such as hydrochloric acid, sulfuric acid and the like.

The amount of the reaction product introduced into the corrosive fluid will suitably be in the range from about 10 to 200 p. p. m. of the corrosive fluid. Amounts of the reaction product from about 25 to 100 p. p. m. give very desirable results.

The reaction product is preferably added to the corrosive fluid in a solution in an organic solvent. For example, the reaction product may be dissolved in a solvent such as toluene, the aliphatic alcohols such as methyl, ethyl and the propyl alcohols and the like. The reaction product may suitably be dissolved in any of the common organic solvents such as those employed to dissolve the nitrocellulose lacquers.

In employing the corrosion inhibitor of the present invention, it may suitably be introduced into the corrosive fluid by injecting same into the fluid so it will be dispersed therein and distributed in contact with the corrodible ferrous metal which is designed to be protected against corrosion by the corrosive fluid. When the corrosive fluid is contained in a container such as a tank, pipe line, and the like, it will be desirable to inject the corrosion inhibitor with the corrosive fluid as it is being introduced into the tank or container, or the corrosion inhibitor may be dumped into the container and the mixture agitated to allow protection against the corrosive fluid. The corrosivity of corrosive fluids such as petroleum or its products in a pipe line where moisture is present may be inhibited by injecting the corrosion inhibitor into the pipe line, through which the corrosive fluid is being pumped, in an inhibiting amount. Thus, gasoline and the like fluids in a pipe line may have the inhibitor introduced therein.

In employing the corrosion inhibitor in oil and gas wells, the reaction product may be suitably introduced into the bore hole adjacent the subsurface formation from which the corrosive fluid containing an acid gas, such as carbon dioxide and hydrogen sulfide, or an organic acid, is produced. Alternatively, the corrosion inhibitor may be introduced directly into ferrous metal containers which are suffering from corrosion from contact with the corrosive fluid, as has been described; thus, with respect to oil and gas wells, the reaction product or corrosion inhibitor may be introduced into a well into the annular space between the casing and the tubing. The corrosion inhibitor may be introduced into the corrosive fluid by introducing it into the subsurface formation from which the corrosive fluid is flowed. Thus the corrosion inhibitor or reaction product may be introduced into a subsurface reservoir through an adjacent well.

Regardless of the way the corrosion inhibitor is introduced into the corrosive fluid, it should be present in the corrosive fluid so that the deleterious effects due to corrosion by contact with the corrosive fluid is substantially reduced or entirely eliminated.

The corrosion inhibitor or reaction product employed in the method of the present invention is suitably formed by reacting an alkylene primary polyamine with a product which is obtained in the preparation of sebacic acid from castor oil. Description of such product and the method of preparation will be found in the patent to McKeever, 2,471,230.

In the McKeever patent, the patentee prepared the reaction product in an amidification reaction to prepare amides by heating the residue resulting from distillation of by-product acids in the preparation of sebacic acid from castor oil with the alkylene primary diamines, such as ethylene diamine, propylene diamine; the diamines having up to 10 carbon atoms, for example, decamethylene diamine may also be employed.

The corrosion inhibitor employed in the present invention is suitably described by McKeever in his patent supra, but it is contemplated that the by-product acids employed in the formation of the reaction product may have characteristics somewhat different from the characteristics disclosed by McKeever in his patent. For example, it has been found that the residues having slightly higher iodine numbers may be employed in the reaction with the alkylene polyamines. McKeever specified a residue having iodine numbers between 30 and 60, whereas residues having iodine numbers from about 60 to about 80 may suitably be used as well. Also, it is contemplated that the alkylene polyamines such as the triamines may be used. Examples of the alkylene polyamines include:

Ethylenediamine,
Diethylenetriamine,
Triethylenetetramine,
Tetraethylenepentamine, and the like.

In this particular instance, a residue, such as described by McKeever, supra, having an acid number range from about 149 to about 158, an iodine value in the range from 61 to 79 and a saponification number from about 170 to 179 was reacted with an amine mixture of diethylene triamine and higher amines. The diethylene triamine was present in the mixture of amines in the amount of approximately 85% while the higher amines were present in the amount of about 15%. The carboxylic acid residue had an average of slightly more than two carboxylic acid groups per molecule with a molecular weight of nearly 1,000.

Thirty per cent of the amine mixture was reacted with 70% of the carboxylic acid residue in the following procedure: The materials were weighed into a container equipped with a mechanical stirring device and a thermometer. The temperature was increased from atmospheric temperature to 320° F. at an average temperature increase of 4° F. per minute after reaching 200° F. and then held at 320° F. for thirty minutes.

Thereafter, the temperature was increased to 430° F. at an average temperature increase of 2.5° F. per minute. The temperature was held at 430° F. for 45 minutes.

During this reaction, no foaming was observed, but considerable fumes were evolved at 260° F. and throughout the reaction time.

Similar runs were made using varying ratios of the amine mixture and the residue carboxylic acids. These ratios varied from 15% amine to 30% amine.

In all cases, the final product was a viscous semi-resinous material of dark amber color having a distinct amide odor and weighing approximately 8.15 pounds per gallon at 60° F.

The product which is used as a corrosion inhibitor is completely miscible in ethyl, propyl and isopropyl alcohols and strong aromatic solvents such as benzene, toluene, xylene and the like. The product which is used as a corrosion inhibitor is also soluble and may be used in solutions in the ketones, such as acetone, and the ethers such as diethyl ether. The corrosion inhibitor is only slightly soluble in paraffinic hydrocarbon solvents and water.

The reaction product formed as described in McKeever, supra, and above was then employed as a corrosion inhibitor after dissolving the corrosion inhibitor in an aromatic solvent such as illustrated.

The corrosion inhibitor was tested in a method wherein the weight loss of mild steel coupons exposed to the corrosive fluids was determined. The mild steel coupon and a glass device for holding the coupon were placed in a test tube having side arm. Both ends of the tube were sealed, and crude petroleum and brine were added through the side arm by means of a manifold in an oxygen-free atmosphere. The fluids were saturated with hydrogen sulfide gas, and the inhibitor was then added. The side arm was sealed, and the tube was mounted on a revolving wheel. At the end of the test period, the coupons were removed, cleaned and the weight loss calculated as percent protection of a blank. In other words, a comparison was made where the mild steel coupons were placed in the corrosive fluid to which inhibitor had been added and with a corrosive fluid containing no inhibitor. Varying amounts of the inhibitor were added and compared with several available corrosion inhibitors. These results are presented in the following table which gives the duration of the tests and the per cent protection afforded by the inhibitors investigated in comparison with the method of the present invention.

TEST NO. 1

[18 days—All are values of two coupons.]

|  | P. P. M. | Percent Protection |
| --- | --- | --- |
| Present Invention | 100 | 96 |
| Inhibitor No. 1 | 100 | 90 |
| Present Invention | 50 | 99 |
| Inhibitor No. 1 | 50 | 90 |
| Inhibitor No. 2 | 100 | 89 |

TEST NO. 2

| Present Invention | 25 | 89 |
| --- | --- | --- |
| Do | 25 | 86 |
| Inhibitor No. 3 | 50 | 83 |
| Inhibitor No. 1 | 25 | 77 |

TEST NO. 3

| Inhibitor No. 3 | 20 | 0–16 |
| --- | --- | --- |
| Inhibitor No. 4 | 20 | 50 |
| Inhibitor No. 1 | 20 | 72 |
| Do | 10 | 0 |
| Present Invention | 20 | 89 |
| Do | 20 | 86 |
| Do | 10 | 52 |
| Do | 10 | 48 |

The present invention was further demonstrated in another method for determining the effectiveness of adding the corrosion inhibitor to corrosive solutions in contact with ferrous metals. This procedure involved adding iron powder to a flask followed by adding the inhibitor thereto and then adding a 0.5% aqueous hydrochloric solution. The mixture was then agitated with a magnetic stirrer. The corrosion rate is a measure of the amount of hydrogen gas evolved by contact of the acid solution with the iron powder.

In a number of such operations which included the employment of several dilute aqueous hydrochloric acid solutions, the present invention showed marked improvement in preventing hydrogen evolution in comparison with several other inhibitors which are commercially available.

The nature and objects of the present invention having been completely described and illustrated, what I wish to claim as new and useful and to secure by Letters Patent is:

1. A method of reducing the corrosiveness to a corrodible ferrous metal of a corrosive fluid comprising water and an acidic component in contact with said ferrous metal which comprises, adding to said corrosive fluid, an inhibiting amount of the reaction product obtained by heating together at an amidification reaction temperature reactive amounts of an alkylene primary polyamine and the residue containing long-chained polycarboxylic acids having an acid number in the range between about 140 and about 180, having an iodine number between about 30 and about 80, and being the nonvolatile material remaining from distilling at a reduced pressure, the by-product acids obtained in the preparation of sebacic acid from castor oil by treatment with alkali.

2. A method in accordance with claim 1 in which the reaction product is added to the corrosive fluid in an amount in the range between 10 and 200 p. p. m.

3. A method of reducing the corrosiveness to a corrodible ferrous metal of a corrosive fluid including hydrocarbon, brine and an acidic component in contact with said ferrous metal which comprises introducing into said corrosive fluid an inhibiting amount in the range between 10 and 200 p. p. m. of the reaction product obtained by heating together at an amidification reaction temperature reactive amounts of an alkylene primary polyamine and the residue containing long-chained polycarboxylic acids having an acid number in the range between about 140 and about 180, having an iodine number between about 30 and about 80, and being the nonvolatile material remaining from distilling at a reduced pressure, the by-product acids obtained in the preparation of sebacic acid from castor oil by treatment with alkali.

4. A method of preventing corrosion of ferrous metal well equipment exposed to a corrosive fluid including hydrocarbon, moisture and an acidic component which comprises introducing into the annular space in said well equipment containing said corrosive fluid an inhibiting amount of the reaction product obtained by heating together at an amidification reaction temperature reactive amounts of an alkylene primary polyamine and the residue containing long-chained polycarboxylic acids having an acid number in the range between about 140 and about 180, having an iodine number between about 30 and about 80, and being the nonvolatile material remaining from distilling at a reduced pressure, the by-product acids obtained in the preparation of sebacic acid from castor oil by treatment with alkali.

5. A method in accordance with claim 4 in which the inhibiting amount is in the range from 10 to 200 p. p. m. of the corrosive fluid.

6. A method of reducing the corrosiveness to a corrosive ferrous metal of a corrosive fluid comprising water and an acidic component in contact with said ferrous metal which comprises forming a solution of the reaction product obtained by heating together at an amidification reaction temperature reactive amounts of an alkylene primary polyamine and the residue containing long-chained polycarboxylic acids having an acid number in the range between about 140 and about 180, having an iodine number between about 30 and about 80, and being the nonvolatile material remaining from distilling at a reduced pressure, the by-product acids obtained in the preparation of sebacic acid from castor oil by treatment with alkali, in an organic solvent and then introducing into said corrosive fluid a sufficient amount of said solution to provide in said corrosive fluid an inhibiting amount of said reaction product.

7. A method in accordance with claim 6 in which the inhibiting amount is in the range from 10 to 200 p. p. m. of the corrosive fluid.

8. A method in accordance with claim 6 in which the acidic component is hydrogen sulfide.

9. A method in accordance with claim 6 in which the acidic component is carbon dioxide.

10. A method in accordance with claim 6 in which the acidic component is hydrochloric acid.

11. A method in accordance with claim 6 in which the acidic component is sulfuric acid.

12. A method in accordance with claim 6 in which the organic solvent is an aromatic hydrocarbon.

13. A method in accordance with claim 6 in which the alkylene primary polyamine is an alkylene primary diamine of not over 10 carbon atoms.

14. A method in accordance with claim 6 in which the alkylene primary polyamine is a mixture of ethylene triamine and higher amines.

References Cited in the file of this patent

UNITED STATES PATENTS

| | | |
|---|---|---|
| 2,471,230 | McKeever | May 24, 1944 |
| 2,646,399 | Hughes | July 21, 1953 |